United States Patent [19]
Kojima

[11] Patent Number: 4,797,236
[45] Date of Patent: Jan. 10, 1989

[54] ULTRAHIGH SPEED INJECTION MOLDING METHOD

[75] Inventor: Hisashi Kojima, Tokyo, Japan

[73] Assignee: Technoplas, Inc., Tokyo, Japan

[21] Appl. No.: 810,892

[22] Filed: Dec. 18, 1985

Related U.S. Application Data

[63] Continuation of Ser. No. 442,433, Nov. 17, 1982, abandoned.

[30] Foreign Application Priority Data

May 9, 1982 [JP] Japan .................................. 57-77179
May 9, 1982 [JP] Japan .................................. 57-77180
Jun. 2, 1982 [JP] Japan .............................. 57-80689[U]

[51] Int. Cl.⁴ ............................................. B29C 45/77
[52] U.S. Cl. .................................. 264/40.1; 264/40.5; 264/328.13; 264/328.16; 264/102; 264/571; 425/546
[58] Field of Search ............... 264/102, 328.13, 40.1, 264/40.5, 328.1, 328.16, 571; 425/546, 584, 812, DIG. 60; 164/113

[56] References Cited

U.S. PATENT DOCUMENTS

| | | | |
|---|---|---|---|
| 3,919,371 | 11/1975 | Jache | 264/46.6 |
| 4,366,110 | 12/1982 | Morita et al. | 264/328.13 |
| 4,412,804 | 11/1983 | Hüther | 425/584 |

FOREIGN PATENT DOCUMENTS

| | | | |
|---|---|---|---|
| 1188794 | 3/1965 | Fed. Rep. of Germany | 425/546 |
| 2805659 | 8/1978 | Fed. Rep. of Germany | |
| 922788 | 4/1963 | United Kingdom | 425/812 |
| 1052889 | 12/1966 | United Kingdom | 425/546 |
| 1052890 | 12/1966 | United Kingdom | 425/546 |
| 2086796 | 5/1982 | United Kingdom | 425/546 |

OTHER PUBLICATIONS

Plastics Mold Engineering Handbook, DuBois and Pribble, Van Nostrand Reinhold Co., 1978, pp. 294–297, 420 and 575.

Primary Examiner—Jan H. Silbaugh
Assistant Examiner—Allan R. Kuhns
Attorney, Agent, or Firm—Wenderoth, Lind & Ponack

[57] ABSTRACT

A method for injection molding a material involving bringing the interior of a tightly sealed injection mold under a high vacuum, then injecting the material into the interior of the injection mold at an ultrahigh speed in the vicinity of a speed at which adiabatic change is exerted on the material in accordance with a predetermined pattern of internal pressure so as to fill the interior of the injection mold with the material, and molding the material under low pressure. An injection molding apparatus used for carrying out the aforementioned method is capable of bringing the interior of the injection mold to a high vacuum.

2 Claims, 4 Drawing Sheets

ULTRAHIGH SPEED INJECTION MOLDING METHOD

This application is a continuation of now abandoned application Ser. No. 442,433 filed Nov. 17, 1982.

BACKGROUND OF THE INVENTION

1. Field of the Invention

The present invention relates to a method for injecting a material, such as plasticized synthetic resin etc., to be molded into an injection mold having its interior held under a high vacuum and molding the material, and to an apparatus therefor.

2. Description of the Prior Art

Matters of primary concern in the injection molding art to date are how the reproducibility in articles molded by an injection mold can be enhanced to the full extent and how the molding cycle can be shortened. Conventional injection molding methods have disadvantages with respect to the reproducibility that it is impossible to obtain accuracy in dimensions on the order of microns, that there still remains a problem of deformation and that a mold joint line is inevitably produced which detracts from the appearance.

With respect to the accuracy in dimensions, at first, the difference in dimension between an article to be obtained and an actually obtained article falls in the range of from 10 to 20 microns. This is caused by exhaust disposition of an injection mold.

There have heretofore been proposed injection molding methods and apparatuses utilizing an injection mold which has its interior vacuumized prior to an injection process. Japanese Patent Public Disclosure No. Sho 56(1981)-123841, for example, aims at mere degassing of the interior of an injection mold by provision of an exhaust and cannot bring the injection mold interior to a state of a high vacuum. In providing a vacuumizing process during the injection molding, the time for exhaust of gas is limited to a given length of time in the molding cycle. In Japanese Utility Model Public Disclosure Nos. Sho 55(1980)-151522 and Sho 56(1981)-19317, a suction port is provided such as in the parting surface of the injection mold. The suction port is formed in the shape of a critical slit (minute aperture) which is generally 10–20 microns in diameter. For this reason, the suction port would require much time to bring the interior of the injection mold to a highly vacuumized state and thus, during a given length of time in the molding cycle, serves merely as a vent for gases. The higher the degree of vacuum, the longer the mean free path of the gas molecules. Therefore, the critical slit if it is used for suction produces great resistance to gas flow and can therefore not sufficiently fulfill the function as a suction port. For example, the diameter of the suction port is required to be about 50 microns so as to cause the injection mold interior to quickly be brought to a pressure below 1 torr and, in order to cause the internal pressure to become $10^{-1}$ torr, the diameter is required to be about 0.5 mm. That is to say, the diameter of a suction port for obtaining a high vacuum must be large enough to correspond to a purpose to be attained, and a special construction is required to achieve the purpose. It is impossible, however, to form such a special construction on the parting surfaces of the mold members of an injection mold which have been closed together and, in order to form such a special construction on the surface of the injection mold in which a cavity is formed, a further complicated construction is required.

Secondly, some kind of deformation is inevitably given to a molded article because the pressure during injection is large and because the temperature of the injection mold is high. High-speed injection is required in order to shorten the molding cycle. However, since high-speed injection has not yet been accomplished, it is necessary to increase the pressure during injection. It is a common knowledge in the art that injection is effected under high pressure and that the pressure within the injection mold (hereinafter referred to simply as "internal pressure") is in the range of from about 500 kg/cm$^2$ to about 1500 kg/cm$^2$, although there has been made an attempt to carry out the molding under ultrahigh pressure of not less than 2500 kg/cm$^2$ so as to make the shrinkage of a material to be molded as small as possible and enhance the accuracy of the dimensions. As a result of such injections, residual stress is exerted on the molded article, giving rise to deformation, such as internal distortion, warps, etc. In view of the fact that the higher the pressure, the larger the distortion of the injection mold, it is necessary to pay attention to structure and strength of the injection mold. This is particularly true in molding which requires accuracy of the article to be obtained, since the injection mold has to be regarded as a precise pressure container taking into consideration the pressure during injection, and various restrictions are imposed on the structure of the injection mold, making it difficult to design a desired injection mold. Further, to allow the injection mold to endure high pressure, the mechanism for clamping the injection mold tends to become large-scale installation. Thus, the requirement that the pressure during injection be increased due to the impossibility of high-speed injection causes a vicious circle and, therefore, shortening of the molding cycle has its own limit.

Thirdly, since it is impossible to avoid change in viscosity of molten resin during the injection process according to the conventional injection techniques, it is impossible to prevent a mold line from being produced. The elevation in temperature of the injection mold to eliminate the production of a mold line is unfavorable because the time for cooling the injection mold is lengthened and because the molten resin becomes inferior.

SUMMARY OF THE INVENTION

An object of the present invention is to provide a method for molding a synthetic resin material under low pressure by injecting the material, at an ultrahigh speed near the speed at which the adiabatic change is caused, into the interior of an injection mold which has been brought to a state of high vacuum to fill the interior of the injection mold with the material, which method is capable of enhancing the reproducibility and shortening the molding cycle.

Another object of the present invention is to provide an apparatus for removing a skin layer formed within the interior of an injection mold by subjecting the interior to purification treatment that is possible because the filling of a synthetic resin material is effected at an ultrahigh speed.

To achieve the objects described above according to the present invention, there is provided a method for injection molding a material, comprising bringing the interior of a tightly sealed injection mold under a high vacuum, then injecting the material into the interior of the injection mold at an ultrahigh speed in the vicinity of a speed at which adiabatic change is exerted on the material in accordance with a predetermined pattern of pressure within the injection mold so as to fill the interior of the injection mold with the material, and molding the material under low pressure; and there is also provided an apparatus for injection molding a material, comprising a tightly sealed injection mold composed of a stationary mold member and a movable mold member, a sprue ejector pin disposed in the movable mold member movable in the forward and backward directions and having its rear end brought into contact with an ejector plate when the sprue ejector pin is moved in the backward direction, and a valve provided on a portion in the vicinity of the leading end of the sprue ejector pin, the movable mold member having a suction port bored therein so as to communicate with the valve.

The other objects and characteristic features of the present invention will become apparent from the disclosure of the invention to be made hereinbelow.

DESCRIPTION OF THE PREFERRED EMBODIMENTS

Figure 1:
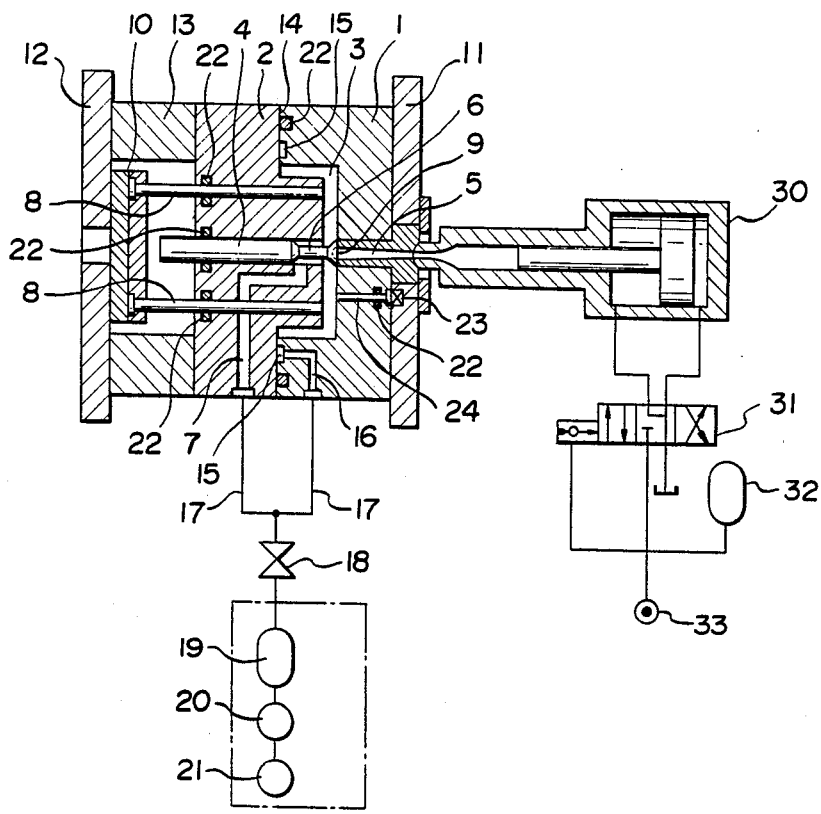
FIG. 1 is a schematic diagram illustrating an injection molding apparatus according to the present invention, which is provided with an injection mold having its interior held under a vacuum.

High-speed injection is fundamentally indispensable to molding of a material with accuracy on the order of microns (hereinafter referred to as "ultra-accuracy"). The speed is preferably as high as possible. Upon conducting various experiments on the speed, the inventor has come to a conclusion that it is optimal to effect the injection at an ultrahigh speed in the neighborhood of the speed at which the adiabatic change is exerted on the molten resin in the course of the resin filling process. The term "injection" used herein involves the step of filling and the step of pressure maintenance, and the term "ultrahigh speed" means a speed at which the step of filling is carried out. Since the molten resin flows very rapidly in the filling process at an ultrahigh speed, there is no time for the injection mold absorb the thermal energy of the molten resin and, therefore, change in viscosity of the molten resin is not caused. That is to say, heat transmission between the molten resin and the inner surface of the injection mold is almost non-existent, thereby bringing the molten resin to a state adjacent to the state of adiabatic change. When the filling speed is further accelerated, the resin is filled into the injection mold in its adiabatic state. The term "ultrahigh speed" is used herein in the sense described above.

It is impossible to achieve the effect of the ultrahigh-speed filling if the speed cannot be controlled. The speed of filling is limited to date by the speed of response of the control valves and the mechanical system. The ultrahigh-speed filling can be accomplished within a time in the range of from 0.05 to 0.01 second from the start to the termination of the filling process irrespective of the amount of the material to be injection molded. According to the experiments conducted by the inventor, by increasing the filling speed, it has been confirmed that L/t of the molten resin is determined without regard to the temperature of the inner surface of the injection mold and therefore that the filling can be carried out under low pressure which cannot be anticipated from the conventional injection molding techniques. The ultrahigh-speed filling can be effected irrespective of the material to be molded. In other words, a material sensible to heat may be used.

There remains problems of eliminating the hindrances caused by the ultrahigh-speed filling. One of them is how gas generated is discharged from the cavity, sprue and runner. Another one is how the ultrahigh-speed filling is controlled.

The gas discharge has heretofore been carried out by utilization of air vents. The presence of the air vents, however, hinders the ultrahigh-speed filling process. This is because the ultrahigh-speed filling causes the interior of the cavity in the vicinity of the gate to come under negative pressure, with the result that atmospheric air enters the injection mold through ejector pin holes and air vents. The injection mold, therefore, has to be airtightly sealed so as not to allow the atmospheric air to enter the injection mold and, at the same time, must have its interior vacuumized prior to the injection process. The degree of vacuum required depends on formation of a molded article with ultrahigh accuracy.

The inventor has continued his studies in pursuit of the reasons why molded articles with ultra-accuracy cannot be obtained by injection molding and, as a result, found that a thin skin layer composed of air and gas to which no attention has been given functions as an adiabatic layer. This skin layer is not uniform in thickness and degree of distribution, depending on the shape etc. of the cavity surface. The degree of distribution varies at every shot of the material to be injected. Since the material is injected into the injection mold in which there exists the skin layer of uneven thickness and varied degree of distribution at every shot, the reproducibility of the injection molded articles becomes inferior. Further, since the skin layer functions as an adiabatic layer in the course of solidification of the material, molten resin in particular, due to heat transmission to the injection mold during the step of pressure maintenance subsequent to the filling process, the shrinkage of the resin is minutely affected by the skin layer. This is a principal cause of the impossibility of manufacturing, by injection molding, parts with ultra-accuracy and ultra-function, which require regular circularity, planeness and cylindricality on the order of microns.

In order to remove the skin layer from the interior of the injection mold, the interior has to be vacuumized to a great extent. In consequence of the experiments conducted, it has been confirmed that the interior must be held at a pressure less than several torr, preferably 1 10$^{-3}$ torr, in order to obtain an article with ultra-accuracy and, in order to obtain an article overcoming the problem of a pinhole, it is required to be held at no higher pressure than 10$^{-3}$ torr.

The control of the filling speed will be described. Upon completion of the ultrahigh-speed filling of the cavity with the molten resin, there occurs a great surge in pressure due to the kinetic energy. The surge pressure is higher than the theoretical pressure in injection, produces shock waves and is propagted in the form of the shock waves within the cavity. Therefore, the surge pressure adversely affects the construction of the injection mold, requiring great strength. If the injection mold is provided with a pin having a cantilever mechanism, the pin will be bent or the core of the injection mold becomes eccentric due to the surge pressure thereby giving rise to distortion of the injection mold. When the surge pressure becomes higher than the force for clamping the injection mold, the parting surfaces of the injection mold are separated and, as a result, there is produced a burr. The surge pressure imparts great distortion to a molded article. When a high-speed filling process is thus required, it is necessary to consider a countermeasure to the surge pressure.

The surge pressure is not exerted until the cavity of the injection mold is filled with molten resin even in the ultrahigh-speed filling process. In order to avoid the influence of the surge pressure, the only thing that can be done is to precisely control the energy and the amount of the molten resin introduced into the cavity within a limited time of ±0.01 second. When the filling speed is relatively low, although within the range of speeds of ultrahigh-speed filling, a valve can function to operate at a precise time. In this case, therefore, no surge pressure is generated and the injection molding can be effected under low pressure.

When molten resin having high viscosity is used as the material to be molded and the injection process is carried out at a high speed, however, it is impossible to prevent the generation of surge pressure by means of the responsiveness of a valve. When the surge pressure has been generated, the surge pressure should be lowered suddenly so as not to subject the mold to the influence of the surge pressure. The surge pressure can be regarded as a pulse comprising sharp waves having leading edges and trailing edges. By setting the width of the pulse to be small, the influence of the surge pressure can be avoided. The smaller the pulse width, the shorter the time of causing the mold members open. Therefore, it is possible both to avoid the generation of burr and to prevent the molded article from being adversely affected. Low-pressure molding can be effected by controlling the injection so as to make the pulse width smaller.

How to control the injection process will be described hereinafter. The inventor proposed a method for controlling the injection speed so that the internal pressure has a predetermined pattern, which method is disclosed in Japanese Patent Public Disclosure No. Sho 52(1977)-14658 and concentrated on the fact that the increase in the amount of the material to be injected can be known directly by the state of ascent of the resin pressure. The aforementioned surge pressure at the maximum internal pressure can precisely be controlled by the following method.

This method comprises providing a sensor for detecting the pressure of the material within the cavity and a sprue and/or a runner of an injection mold, predetermining a pattern of internal pressure capable of obtaining a good-quality article, and providing the injection cylinder with electric and hydraulic servomechanisms for causing the internal pressure during every shot to coincide with the predetermined internal pressure pattern, thereby precisely controlling the amount of the material to be injected in every shot and simultaneously preventing surge pressure from being generated immediately before the completion of the filling process and thereby stabilizing the quality of the molded articles. Compared with any other conventional methods, this method can easily achieve conditions for controlling the internal pressure. In the ultrahigh-speed filling process, it is unnecessary to provide a number of patterns for the injection conditions. It is sufficient that two patterns, one determined by the kind of a material to be used and the other by the construction of an injection mold to be used, are predetermined. The pattern of internal pressure is determined on the basis of the results of a number of experiments on ultrahigh-speed filling.

Figure 2:
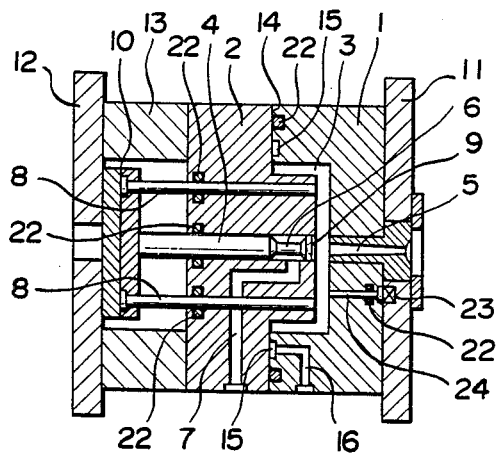
FIG. 2 is a schematic diagram of the injection mold illustrating the construction of the vacuumized interior thereof.

With reference to one embodiment of the present invention according to FIGS. 1 through 6, an injection mold comprises a stationary mold member 1 and a movable mold member 2 between which a cavity 3 is defined. To the movable mold member 2 is attached a sprue ejector pin 4 which is capable of reciprocating axially and is disposed coaxially relative to a sprue 5 which is formed in the stationary mold member 1. The pin 4 has a reduced diameter portion 6 formed in the vicinity of the leading end thereof, i.e. the end toward the cavity 3, so as to form thereon a valve for suction means. A suction port 7 is bored in the movable mold member 2 to communicate with the valve. The pin 4 has a larger diameter than that of other ejector pins 8 and has in the center of the leading end surface a hemispheric resin-receiving portion 9. The portion 9 has a diameter substantially the same as or larger than the diameter of the sprue 5 or a gate. The pin 4 normally has its rear end spaced from an ejector plate 10 as shown in FIG. 1 and, when moved to the backward direction, is brought into contact with the ejector plate as shown in FIG. 2. Therefore, the pin 4 protrudes when the rear end thereof is pushed by moving the ejector plate 10 forward and remains in its protruding position without following the backward movement of the ejector plate 10. Upon clamping the injection mold, the leading end of the pin 4 comes into intimate contact with the sprue 5. Denoted by 11 and 12 are a stationary fitting plate for the stationary mold member and a movable fitting plate for the movable mold member respectively. Reference numeral 13 denotes a spacer block. In a parting surface 14 of the injection mold is bored an air vent groove 15 small enough not to admit molten resin, which air vent groove 15 communicates with a suction port 16. The suction ports 7 and 16 communicate with a vacuum device through a tube 17 and a vacuum valve 18. The vacuum device comprises a vacuum tank 19, a mechanical booster 20 and a vacuum pump 21 and these component parts operate to achieve a predetermined degree of vacuum so as to immediately bring the cavity 3 and the sprue 5 under a high vacuum. To retain the cavity 3 under a high vacuum, the periphery of the cavity 3 is tightly sealed with seal packing 22 as sealing means. A pressure detecting pin 24 of a pressure sensor 23 for detecting the internal pressure is exposed to a portion of the cavity 3 in the vicinity of the sprue 5.

The injection molding apparatus is further provided with an injection cylinder 30, a servo valve 31, an accumulator 32 and an oil-pressure source 33. The accumulator 32 has accumulated therein fluid energy necessary for sufficiently carrying out ultrahigh-speed injection.

The vacuumizing process will be described on the basis of use of the construction as described above. The sprue ejector pin 4 is in its protruding position after a molded article has been ejected. Upon completion of clamping of the injection mold, since the sprue ejector pin 4 is projected by the ejector plate 10, a suction space is formed around the reduced diameter portion 6. The suction space is made large by making the diameter of the sprue ejector pin 4 large. When the injection mold has been clamped, since the cavity 3 communicates with the suction port 7, the cavity 3 and the sprue 5 are immediately brought to a state of a high vacuum by opening the vacuum valve 18. As a result, the cavity 3 is subjected to a purification treatment to thereby completely remove the skin layer formed in the cavity. In other words, one of the conditions for good reproducibility has been fulfilled. In this case, the cavity 3 has been sealed off completely from the atmosphere. The injection process will start after a time interval after the aforementioned high vacuumization. This time interval may be a small moment of less than about one second.

The aforementioned vacuumizing process terminates at the start of the filling process. To be specific, when the filling process starts, the molten resin is poured into the sprue 5 by the injection cylinder 30 and the pressure of the molten resin is exerted on the resin-receiving portion 9 which has stopped up the sprue 5, with the result that the sprue ejector pin 4 is pushed back to close the valve. The sprue ejector pin 4 is moved backwardly to its retracted position and brought into contact with the ejector plate 10. In this case, since the sprue ejector pin 4 has a large diameter and is provided at the leading end thereof with the resin-receiving portion 9 and disposed coaxially relative to the sprue, it will immediately be moved backwardly without being bent by the pressure of the molten resin, and the molten resin does not enter the valve. The molten resin at first flows along the inner surface of the stationary mold member 1 because the resin-receiving portion 9 has a hemispheric surface. In the state wherein the sprue ejector pin 4 is in its retracted position, the gas is being discharged from the air vent groove 15 and the minute gap around the sprue ejector pin 4.

The injection control process utilizing a pattern of the internal pressure will be described on the assumption that the aforementioned vacuumizing process has been completed.

Figure 3:
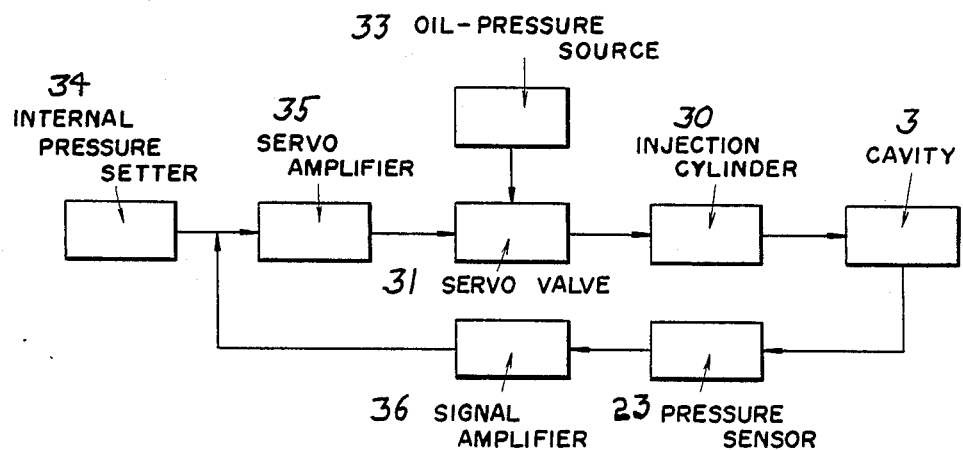
FIG. 3 is a block diagram showing a system for controlling the internal pressure.
Figure 4:
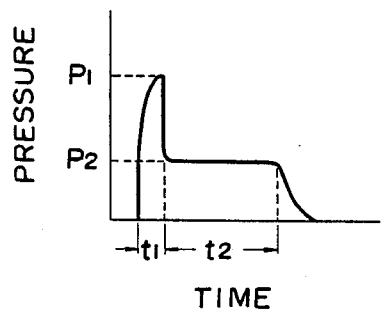
FIG. 4 is a graph showing a typical pattern of internal pressure.

An electric signal corresponding to the pressure set in an internal pressure setter 34 in FIG. 3 is supplied to a servo amplifier 35 and, on the basis of the supplied electric signal, the servo valve 31 adjusts the oil pressure from the oil-pressure source 33 and supplies the oil pressure to the injection cylinder 30. The injection cylinder receives the energy accumulated in the accumulator 32 and causes the molten resin to be injected into the cavity 3. In this case, the internal pressure detected by the pressure sensor 23 is fed back in a closed-loop control system and the injection cylinder 30 is controlled to allow the internal pressure to conform to the predetermined internal pressure pattern. Denoted by 36 is an amplifier for amplifying the signal from the pressure sensor 23.

More specifically, when the servo valve 31 is substantially completely opened to drive the injection cylinder 30 under substantially maximum pressure at a substantially maximum speed, the molten resin is injected into the cavity 3 at an ultrahigh speed. Immediately before the cavity 3 is filled with the molten resin, the internal pressure is fed back in the closed-loop control system so that the internal pressure will conform to the predetermined maximum internal pressure $P_1$, and the injection cylinder 30 is controlled. To be more exact, the control may be effected in an open-loop control system at the beginning of ultrahigh-speed filling. The internal pressure has a pattern such that the line between the leading edge and the trailing edge becomes substantially straight with the portion in the vicinity of the leading edge inclined slightly. Upon reaching the maximum pressure $P_1$, the internal pressure is rapidly reduced by substantially completely closing the servo valve 31 immediately thereby stopping the oil pressure. As a result, the internal pressure has a pattern of a line dropping substantially perpendicularly from the leading edge. The two patterns as a whole form a pulse-like pattern. The width of the pulse wave indicates the filling time $t_1$. Since the time $t_1$ is less than 1/10 of the conventional filling time, the influence of the surge pressure can be avoided. The oil pressure is controlled so that maintenance pressure $P_2$ remains constant until the molten resin is solidified. The pressure $P_2$ is set to be low as a necessary consequence by reducing the oil pressure in the form of the pulse wave. The maintenance time $t_2$ can be made shorter by the period of time for the injection mold being cooled than that required when the injection mold has been heated.

According to the embodiment as described above, it is possible to precisely control the internal pressure to conform to the maximum pressure $P_1$ for the desired time and carry out the ultrahigh-speed filling without speed unevenness.

It is possible to adopt the internal pressure patterns shown in FIGS. 5 and 6, which will be explained hereinafter.

Figure 5:
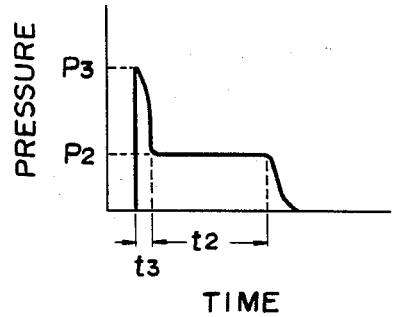
FIG. 5 is a graph showing another pattern of internal pressure.

The internal pressure pattern shown in FIG. 5 is obtained by setting in advance an allowable range of maximum internal pressure $P_3$ capable of avoiding either an insufficient or excess amount of the molten resin injected, effecting the ultrahigh-speed filling process by application of the maximum oil pressure at a maximum speed in an open-loop control system and reducing the oil pressure in the closed-loop control system to cause the internal pressure to be decreased to the maintenance pressure $P_2$. In this case, the filling time $t_3$ can be shortened to a great extent and the influence of the surge pressure can be made very small. Although there is a case where unevenness occurs more or less in the aforementioned allowable range, since there is no time for the resin to be affected by the disturbance, the unevenness can be prevented from occurring to the maximum extent.

Figure 6:
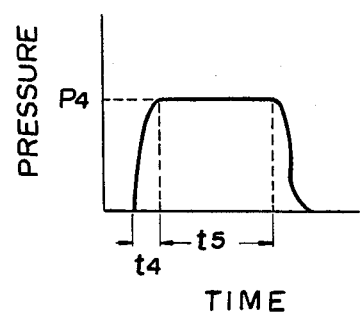
FIG. 6 is a graph showing still another pattern of internal pressure.

The internal pressure pattern shown in FIG. 6 is obtained by setting in advance an allowable range of maximum internal pressure $P_4$ capable of avoiding either an insufficient or excess amount of the molten resin injected and utilizing the set pressure $P_4$ as the maintenance pressure. In this case, the feed-back control is effected in the closed-loop control system. As a consequence of various experiments, it has been found that this pattern can advantageously be used as a pattern for a resin having low viscosity and no surge pressure is generated.

Figure 7:
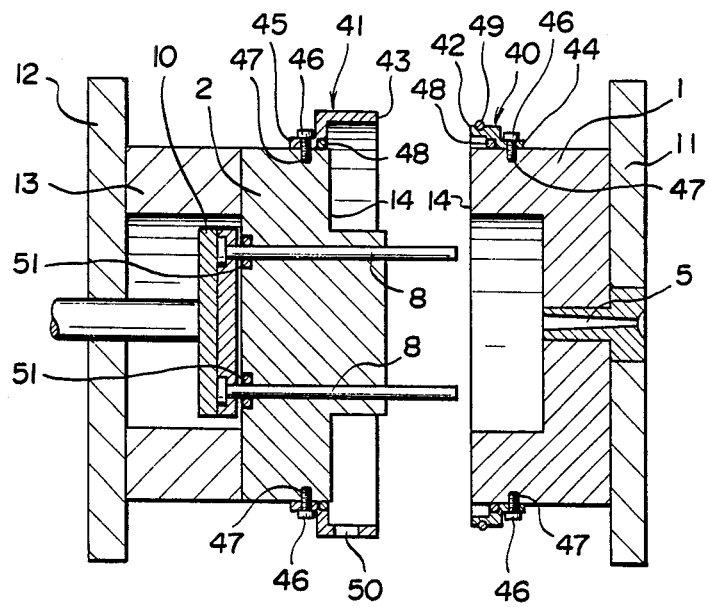
FIGS. 7 and 8 are schematic diagrams of another injection mold illustrating the construction of the vacuumized interior thereof.
Figure 8:
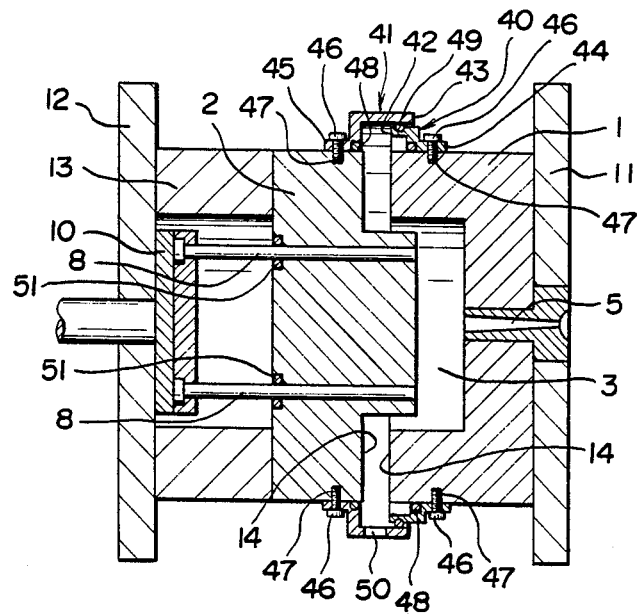

FIGS. 7 and 8 are schematic views of another injection mold illustrating the construction of the vacuumized interior thereof and which omits the sprue ejector pin 4. In the following description, the component parts identical with or similar to those in the above described embodiment will be denoted by like numerical symbols and the duplication in explanation has been omitted.

In these Figures, denoted by 40 and 41 are cylindrical cover members functioning as sealing and suction means and provided on the outer periphery of the injection mold. The cover members 40 and 41 are mounted on the outer peripheries of the stationary and movable mold members 1 and 2 respectively so that the open ends 42 and 43 are disposed face to face and are fixed at their respective smaller diameter base ends 44 and 45 to the mold members by means of fasteners 46 such as bolts from the outside of the injection mold. Denoted by 47 are screw holes bored in the outer periphery of the injection mold. The surfaces abutting each other are sealed by packings 48. Although the positions for the packings may optionally be chosen, they are preferably in the vicinity of the parting surfaces 14 so as to reduce the volume required to be placed under a vacuum by removal of gas therefrom. One of the cover members 40 has its open end 42 extending to a position substantially the same as the position of the parting surface 14 of the stationary mold member 1 and is provided on the outer periphery of the open end 42 with packing 49. The open end 42 may protrude past the parting surface 42 depending on the construction of the injection mold. The other cover member 41 has a size such that the cover member 40 fits therein and has its open end 43 protruding from the parting surface 14 of the movable mold member 2 to a position at which the open end 43 does not interrupt the ejection or extraction of a molded article. Preferably the open end 43 extends to a position at which the open end 42 of the cover member 40 fits in the open end 43 in a low-speed low-pressure mold-closing region in the course of the mold clamping. The cover member 41 has a suction port 50 which communicates with a vacuum device (not shown) and has a suitable diameter. Further, denoted by 51 are packings for sealing the ejector pins 8.

The cover member 41 is moved forward and backward in the movement of the movable mold member 2 and, when the mold members are in their open state illustrated in FIG. 7, is spaced from the cover member 40. In this case, the suction for vacuumization from the suction port 50 is not effected. A molded article can be taken out of the injection mold by the operation of the ejector pins 8 without being interrupted by the cover member 41.

In the low-speed low-pressure mold-closing region in the course of the mold clamping, as shown in FIG. 8, the cover member fits 40 in the cover member 41. At this time, the cover members 40 and 41 are sealed with the packings 48, 49 and 51 and, at the same time, since a nozzle (not shown) of the molding machine comes into intimate contact with the sprue 5, the interiors of the cover members 40 and 41 are completely tightly sealed. Since the parting surfaces, 14 of the mold members are spaced from each other to form a suitable suction space, the cavity 3 and the interiors of the cover members 40 and 41 are brought to a state of high vacuum immediately after the start of the suction process for vacuumization. As a result, the skin layer is completey removed from the cavity 3 to fulfill one of the conditions for the reproducibility of articles to be molded by the injection mold. Since the suction process for vacuumization is continuously effected between the start point and the termination point of the low-speed low-pressure mold-closing region in the course of the mold clamping, the degree of vacuum in the cavity 3 and the interiors of the cover members 40 and 41 can be increased to the degree necessary. Since the suction process for vacuumization continues even upon completion of the mold clamping, when a material is injected into the cavity 3, it is possible to discharge the gas through the minute gap between the parting surfaces 14 to the interiors of the cover members 40 and 41.

To be more specific, the interiors of the cover members 40 and 41 are maintained under a high vacuum and the degree of vacuum becomes higher and higher. Even though the suction process for vacuumization is stopped, the aforementioned interiors are still maintained under a high vacuum. On the other hand, the degree of vacuum in the cavity 3 is reduced gradually and gas is generated in the cavity 3 by the injection of the material. For this reason, there is a great difference in degree of pressure between the interiors of the cover members and the cavity 3. Since the pressure difference is exerted on the entire areas of the parting surfaces 14, the gas in the cavity 3 is immediately discharged from the injection mold. The gas discharge is effected until the injection molding is finished. However, it is unnecessary to continuously effect the suction process for vacuumization. This is because the gas can be sufficiently discharged by the aforementioned pressure difference.

According to the embodiment described above, since the cover members 40 and 41 are provided on the outer peripheries of the mold members and in the vicinity of the parting surfaces 14, it is not required to pass hoses for cooling water, oil pressure, etc. through the cover members 40 and 41. Further, it is possible to install the cover members 40 and 41 in advance on the injection mold, thereby enhancing the assembly. For the reasons described above, it is possible to reduce the inner volume including the volume of the cavity 3 required to be placed under a vacuum as much as possible.

Figure 9:
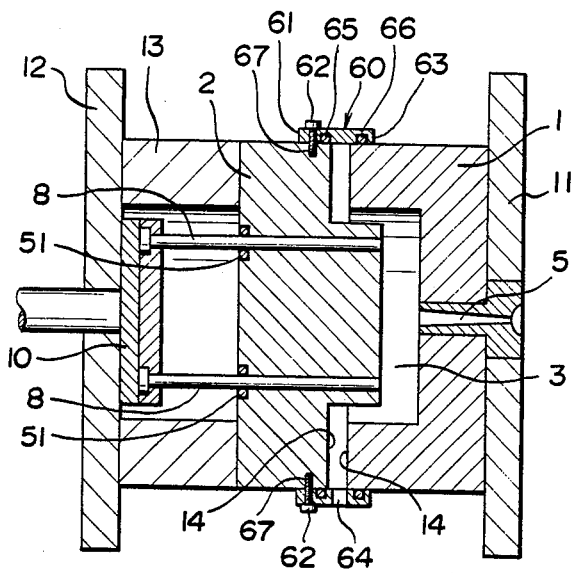
FIG. 9 is a schematic diagram of still another injection mold illustrating the construction of the vacuumized interior thereof.

The aforementioned cover members can be as shown in FIG. 9, for example. A cylindrical cover member 60 is attached to one of the mold members so as to admit therein the outer periphery of the mold member. The base end 61 of the cover member 60 is fixed to the periphery of the mold member with fasteners 62 and the open end 63 extends over the parting surface. In this Figure, reference numeral 64 denotes a suction port, 65 and 66 packing, and 67 a screw hole bored in the mold member.

According to this embodiment, the number of parts of the injection mold for vacuumization can be reduced to the minimum because the screw hole 67 may be merely bored in the outer periphery of the movable mold member 2. Besides, the ease of assembly can be considerably be enhanced because it is sufficient to allow the single cover member 60 and the mold member to be fitted within and fixed to each other without requiring any complicated timing adjustment as is required in other constructions. Particularly, the volume to be placed under a vacuum can be reduced to the minimum.

In this embodiment, it has been assumed that the outer periphery of the stationary mold member 1 has the same size as that of the outer periphery of the movable mold member 2. In case the sizes differ, the cover member 60 is fixed to the smaller-size mold member and has the open end thereof formed to meet the outer periphery of the large-size mold member, thereby achieving the effects similar to the aforementioned embodiments.

Figure 10:
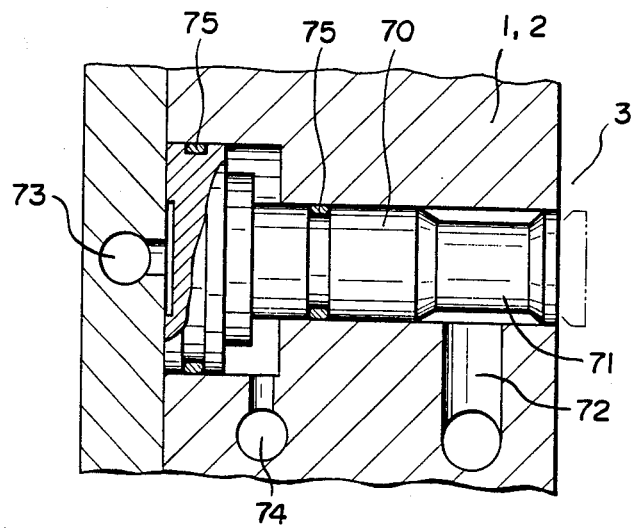
FIG. 10 is a schematic diagram of the principal parts of a further injection mold illustrating the construction of the vacuumized interior thereof.

FIG. 10 is a schematic diagram showing another injection molding apparatus applicable to a mold construction which avoids use of the sprue ejector pin 4.

Denoted by 70 is a reciprocating lever which is provided in the injection mold so as to be moved forward and backward and exposed to the cavity 3 or a runner at the leading end thereof. A reduced diameter valve portion 71 is provided on a portion in the vicinity of the leading end of the lever. A suction port 72 is bore in the injection mold so as to communicate with the space around valve portion 71. The rear end of the lever 70 communicates with fluid supply holes 73 and 74 for providing fluid for switching the valve. Denoted by 75 is a seal packing.

The forward movement of the lever 70 causes the space around valve portion 71 to communicate the cavity 3 and suction bore 72 at the time of termination of the mold clamping, there by obtaining a high vacuum state by use of a vacuum device (not shown) which communicates with the suction port 72, and is moved rearwardly to cut off the communciation at the time the filling process starts. The gas generated in the cavity is discharged from the minute gap around the lever 70 during the filling process to the outside of the injection mold.

In the embodiments described above, the cover member is attached to the peripheries of one or both the mold members of the injection mold. However, the attachment of the cover member does not interfere with the installation of the fitting plates 11 and 12.

As described above, according to the present invention, there are obtained various advantages. Since it is possible to bring a material into direct contact with the inner surface of the injection mold from which the skin layer comprising air and gas has been removed and to mold the material into a molded article, it is possible to obtain a molded article with accuracy of dimension on the order of microns which corresponds to the dimension of the injection mold. Since the discharge of gas during the filling process in cooperation with the removal of the skin layer is effected, the conditions for reproducibility can be made constant for every shot and, therefore, the cause of unevenness of the molded articles can be eliminated. The problem of appearance, i.e. the problem of production of seam lines, can be solved by carrying out the filling process at an ultrahigh speed. Accordingly, it is possible to injection mold video disks, long-playing record disks, precision optical lenses and other ultra-precision parts.

By carrying out the filling process at an ultrahigh speed, the filling time can considerably be shortened, i.e. in the range of from 0.1 to 0.01 second. The ultrahigh-speed filling process is carried out in the state near the adiabatic change and, therefore, the molding cycle can be shortened in the state wherein the temperature of the injection mold is lowered because there is no influence of the temperature of the injection mold and the temperature and kind of the material.

Further, according to the present invention, since it is possible to effect the filling process at un ultra-high speed and the molding process under low pressure, it is possible to obtain a molded article having no deformation and without generating residual stress. If an insert should be present, it does not damage the molded article. Therefore, it is possible to injection mold cable connectors for optical communication, transistors, integrated circuits and other mold packages. When the present invention is applied to transfer molding, it is possible to further lower the pressure during molding. Due to the low-pressure molding, the construction of the injection mold and that of the mold clamp can be simplified, thereby lengthening the service life of the apparatus. Any kind of materials, i.e. a metal such as copper, nickel, ferrite, etc. or ceramic or any composite thereof, can be injection molded. Since the materials having low fluidity which cannot be molded by the conventional encapsulation method can be sealed and molded under low pressure, electric characteristics can be made superior.

The present invention is also applicable to die-cast molding and rubber molding and can contribute to enhancement of the quality and producibility higher than that obtained to date. When the present invention is applied to die-cast molding, for example, since it is possible to effect low-pressure molding under a high vacuum, no oxidized film is formed such as on aluminum and no cracks occur. Particularly when a thermosetting resin material is used as the material to be molded, it can be said that the present invention is an optimal method because it is possible to prevent both the generation of gas and the production of burr.

Since the valve is provided on the sprue ejector pin, in one of the embodiments, a large suction gap can be provided and, therefore, a high-vacuum state necessary for the ultra-high-speed injection can be immediately obtained. Further, since the valve on the sprue ejector pin can be opened synchronously with the timing of completion of the mold clamping and can be closed simultaneously with the injection of the material, the start and termination of the vacuumization can easily be effected precisely. Since the valve on the sprue ejector pin is disposed in the substantially central portion of the cavity, the suction process can be carried out effectively.

Since the cover member extends over the parting surface, in another embodiment, the suction process for vacuumization can be effected over the entire open region in the injection mold in the low-speed low-pressure mold-closing region during the course of the mold clamping and, as a result, the cavity can immediately be vacuumized to a degree of vacuum which is the same as that in the interior of the cover member. Further, since the injection mold is sealed off from the outside thereof, gas is discharged from the entire parting surface during the injection process.

Since the movement of the movable mold member to the low-speed low-pressure mold-closing region in the course of the mold clamping and the sealing of the injection mold can be effected at the same time depending on the length of the cover member, the time at which the suction process for vacuumization is effected can suitably set. The suction process for vacuumization can automatically be changed over to the gas discharging process in accordance with the amount of the space between the mold members. Further, since it is possible to vacuumize the cavity by use of the cover member, it is possible to eliminate the need for formation of suction ports and air vents in the injection mold. Therefore, the present invention can be applied to dies difficult to seal, such as split dies, slide-type dies, dies having restriction gates for obtaining a plurality of molded articles at one time, for example.

In the embodiment described hereinbefore, the vacuum device comprises the vacuum tank 19, the mechanical booster 20 and the vacuum pump 21. It should be noted, however, that the vacuum tank 19 is not an indispensable constituent. High vacuumization can be obtained by a construction wherein the mechanical booster 20 and the vacuum pump 21 are connected in series.

Further in the aforementioned embodiments, the suction ports 50 and 64 are bored in the cover members 41 and 60 respectively. However, it goes without saying that the suction ports may be bored in the movable mold member 2.

What is claimed is:

1. An injection molding method, including a filling process in which a plasticized material is injected into a metal mold composed of a stationary mold member and a movable mold member and a molding pressure maintenance process in which the internal pressure of the material which has been injected into the mold is maintained constant, which method comprises the steps of:

predetermining an internal pressure pattern representing reference internal pressure in the mold during a filling time in which the filling process is carried out and during a molding pressure maintenance time in which the internal pressure is maintained, providing the filling time from the start to the termination of the filling process to be in the range from 0.05 to 0.01 sec., and providing the molding pressure maintenance time following said filling time, said internal pressure pattern having the internal pressure during the molding pressure maintenance time equal to or lower than the pressure during said filling time, and having the maximum internal pressure during the filling time;

tightly sealing the interior of the mold from the atmosphere surrounding the mold;

exerting a large suction on the interior of the mold to evacuate the interior of the mold to a high vacuum at least as low as $10^{-3}$ torr;

injecting the plasticized material into said mold during said filling time at ultrahigh speed while controlling the internal pressure in the mold in accordance with said predetermined internal pressure pattern, thereby causing the material to fill the interior of the mold before heat escapes from the material sufficient to reduce the viscosity thereof; and maintaining the internal pressure of the plasticized material under low pressure in the mold during the molding pressure maintenance time in accordance with said predetermined internal pressure pattern, thereby obtaining a molded article with accuracy of dimension on the order of microns corresponding to the dimensions of the mold.

2. An injection molding method as claimed in claim 1 further comprising continuing evacuation of the interior of the mold during the imjection of the material.

* * * * *